June 4, 1929.  F. GRAF  1,715,596

POWER TRANSMISSION DEVICE

Original Filed Feb. 17, 1927

INVENTOR.
Fred Graf
BY Albert M. Austin
ATTORNEY

Patented June 4, 1929.

1,715,596

UNITED STATES PATENT OFFICE.

FRED GRAF, OF SOUTH BEND, INDIANA, ASSIGNOR TO VERNE E. MINICH, OF SCARSDALE, NEW YORK.

POWER-TRANSMISSION DEVICE.

Application filed February 17, 1927, Serial No. 168,874. Renewed June 5, 1928.

This invention relates to power-transmission devices, and more particularly, to a belt-driven appliance which is adapted to transmit comparatively large amounts of power and to automatically adjust the tension of the driving belt in accordance with the power transmitted, whereby the tension of the belt is increased when the applied power is comparatively great and is decreased when comparatively small amounts of power are being transmitted.

The invention further relates to an automatic belt-tightening, power-transmission device which may be carried entirely by the driven shaft and which automatically operates to vary the tension of the belt directly in accordance with the power transmitted to said shaft.

The invention further relates to a device of the above character which, in addition to automatically adjusting the tension of the belt and controlling the slippage thereof in accordance with the power transmitted, operates to absorb variations in transmitted power and prevent such variations from being transmitted to the driving motor or causing injury to the driving mechanism.

This invention comprises a driving shaft, which extends parallel to and is mounted for epicyclic movement about a driven shaft, cooperating spur-gears being carried by both of said shafts for transmitting power therebetween.

A driving belt cooperates with a belt pulley on the driving shaft and causes rotation thereof in such direction that the gears on the driving shaft tend to roll about the gears on the driven shaft, this tendency being opposed by the tension of the belt. When the tension of the belt becomes sufficient to transmit an amount of power to the belt pulley equal to that required for driving the mechanism, the epicyclic movement of the driving shaft ceases and further rotation thereof serves to drive the spur-gears attached to the driven shaft. The belt is thereafter automatically maintained at the proper tension for transmitting the required power.

Figure 1:
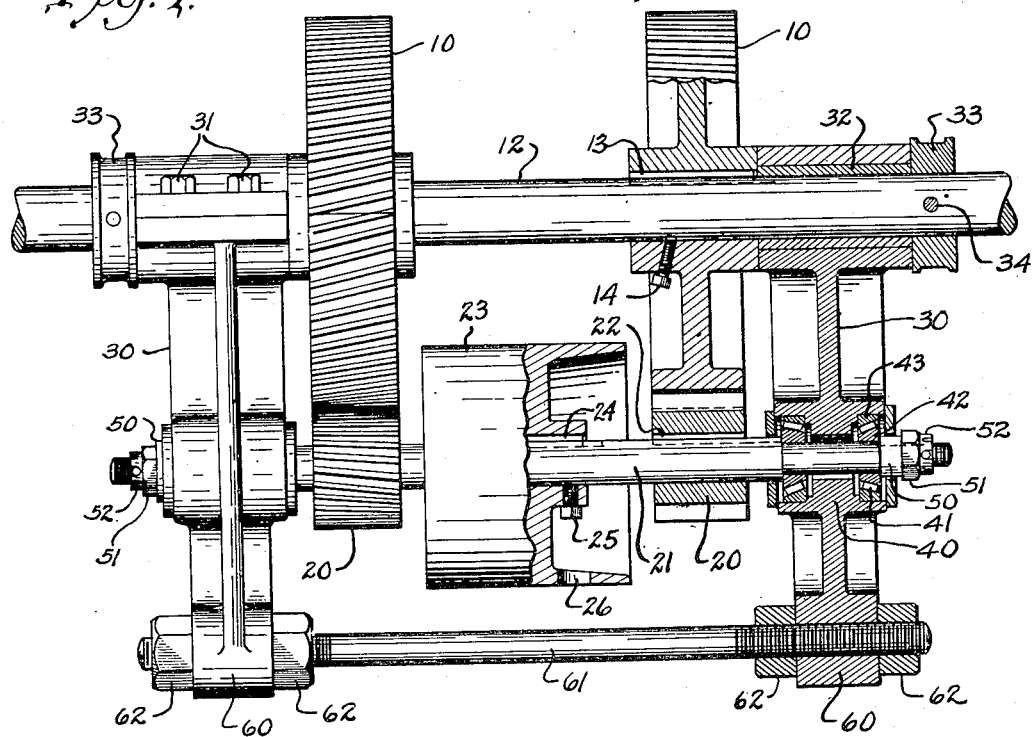
Figure 2:
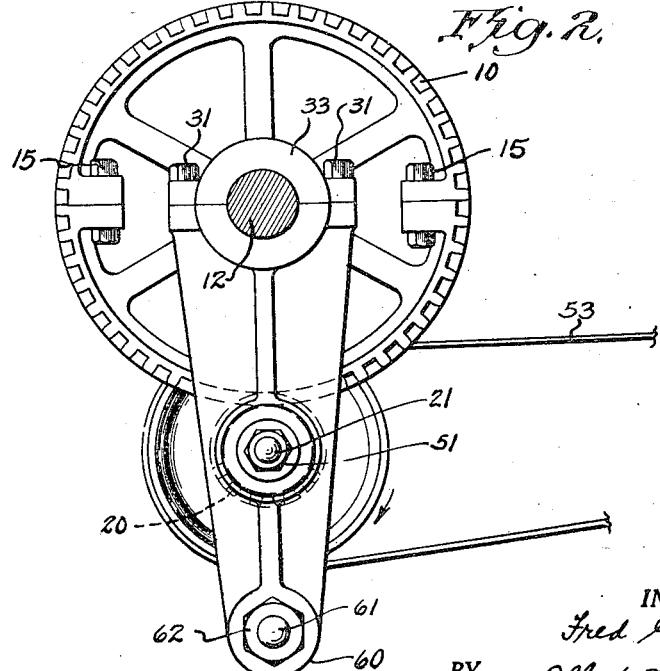

Although the novel features which are believed to be characteristic of this invention will be pointed out with particularity in the claims appended hereto, the invention itself, as to its objects and advantages, the mode of its operation and the manner of its organization may be better understood by referring to the following description taken in connection with the accompanying drawings forming a part thereof, in which Fig. 1 is an elevation, partly in section, of a power-transmission device constructed in accordance with this invention; and, Fig. 2 is an end view of the apparatus shown in Fig. 1.

Like reference characters denote like parts in the several figures of the drawings.

In the following description and in the claims parts will be identified by specific names for convenience, but they are intended to be as generic in their application to similar parts as the art will permit.

Referring to the drawings more in detail, a pair of spur-gears 10 are mounted upon driven shaft 12, which is adapted to transmit power to any desired appliance. Gears 10 are spaced apart and rigidly secured to shaft 12 by means of keys 13 for preventing relative rotational movement therebetween, set screw 14 being provided for cooperating with shaft 12 and preventing longitudinal movement of the gears thereon.

Set screw 14 is preferably threaded in and carried by the hub portion of spur-gears 10 and enters a recess in shaft 12. Gears 10 may be formed in two sections to facilitate assembly and joined by suitable means as by bolts 15 passing through cooperating ears on the two sections of the gear.

Pinions 20 are rigidly attached to driving shaft 21 and mounted in spaced relation thereon for cooperation with gears 10. Pinions 20 may be attached to shaft 21 by keys 22, or may be fastened thereto in any other suitable manner. Belt pulley 23 may be carried by shaft 21 between pinions 20 and rigidly fixed to said shaft by key 24 and set screw 25. A suitable opening 26 may be provided in the periphery of pulley 23 to permit access to set screw 25 for purposes of adjustment.

Shaft 21 may be mounted in suitable bearing arms 30, said arms being mounted for rotational movement about shaft 12. The portion of arms 30 surrounding shaft 12 may be split to provide convenient means for mounting the same, and the two split portions may be joined by bolts 31 passing through projecting ears on said portions. Bearing metal 32 may be carried by the split portions of arms 30 surrounding shaft 12 for providing a suitable bearing to permit rotational movement.

Arms 30 are mounted on shaft 12 on the outside of gear-wheels 10 and prevented from longitudinal movement in one direction by the hub portions of said gear-wheels. Movement in the other direction may be prevented by collars 33, which may be rigidly attached to shaft 12 by pins 34 or other suitable means. The arms 30 are thus free to rotate about shaft 12 but are prevented by the hubs of gears 10 and by collars 33 from longitudinal movement with respect thereto. Collars 33 may be split if desired to facilitate assembly.

Suitable bearings 40 for shaft 21 are provided in arms 30, shaft 21 being extended through said bearings and mounted for rotational movement therein. Bearings 40 may comprise rollers 41, which may be of the usual construction and adapted to rotate between cones 42 and a suitable surface 43 carried in arm 30. Shaft 21 may be prevented from longitudinal movement in said bearing by washers 50 and co-operating nuts 51 carried on the ends of said shaft, lock-nuts 52 being provided for positively maintaining the desired adjustment.

The free ends of arms 30 may be enlarged by bosses 60 which may be provided with suitable holes for the insertion of a tie rod 61, said rod being held in firm engagement therewith by nuts 62. Tie rod 61 strengthens the entire assembly and prevents any bending movement from being exerted on shaft 21.

The end thrust of shaft 21 on bearings 40 may be minimized by cutting the teeth and spur-gears 10 in oppositely inclined directions, whereby the thrust exerted by the teeth of one of these gears upon its pinion 20 is counteracted by that exerted by the other of said gears on its cooperating pinion. The arrangement thus mounted may be driven by a belt 53 cooperating with pulley 23.

When driven in the direction indicated by the arrow in Fig. 2, pinions 23 will tend to roll around the periphery of gears 10 in a clock-wise direction. In so moving, arms 30 will rotate around shaft 12 in a clock-wise direction, carrying shaft 21 and belt pulley 23 therewith. The direction of movement of pulley 23 being opposite to that in which the driving belt extends, any movement of the pulley will be opposed by the pull of said belt.

Assuming that power is to be applied to the belt pulley for starting shaft 12 and any apparatus associated therewith, the belt will only have to transmit sufficient power to overcome the friction of shaft 21 and bearings 40 and the inertia of the various parts, in order to initiate movement of said pulley 23. When pulley 23 begins to rotate it will cause pinions 20 to execute an epicyclic movement about gears 10. Arms 30 will then rotate in a clock-wise direction, and in so doing will tighten the driving belt.

When the tension on the driving belt becomes sufficiently great to prevent further rotational movement of arms 30, pinions 20 in continuing to rotate will drive the gears 10. Should the power required to drive gears 10 be comparatively small, the amount of rotational movement of pinions 20 about the periphery thereof would be correspondingly decreased, consequently the driving belt would remain comparatively slack.

As soon as the power required to turn shaft 12 is increased, arms 30 will begin to rotate about said shaft as an axis, and in so doing tighten the belt until a point is reached at which the various forces are in equilibrium, the power received from the driving belt being just sufficient to cause rotation of the driven parts. Should the power be suddenly increased or decreased, the variation would be immediately taken up as the difference in tension of the driving belt and would not be transmitted to the driving means so as to cause injury to the various parts of the apparatus.

The device has been shown as applied to a driven shaft, but obviously it may be attached to a driving shaft and the belt pulley caused to drive the belt, if desired, the direction of rotation being such as to cause the pulley to tighten the belt in a manner similar to that above described.

By employing a device of this character, not only are the variations in power automatically prevented from reaching the driving means, but the belt itself is only subjected to the amount of tension necessary to transmit a given amount of power. The belt, therefore, when transmitting a small amount of power, is under a comparatively slight tension and the strain thereon is relieved. When transmitting large amounts of power, the belt is under such tension as is necessary to transmit that power. This apparatus avoids the necessity for maintaining the belt constantly under an amount of tension necessary to transmit the maximum amount of power required.

The apparatus has a further advantage in that adjustments during use to compensate for wear or strain on the belt are eliminated. The apparatus automatically operates to take up any undesired slack in the driving belt, in addition to maintaining the belt only sufficiently tight to transmit the required power.

This invention is particularly applicable for the transmission of comparatively large amounts of power, inasmuch as two spur-gears 10 are employed and means are provided for causing the driving shaft to cooperate with both of these gears. The end thrust, which in some types of apparatus is extremely objectionable, may be eliminated